No. 795,141. PATENTED JULY 18, 1905.
W. LAWRENCE.
MEANS FOR CHARGING BREAD INTO AND WITHDRAWING IT FROM BAKERS' OVENS.
APPLICATION FILED NOV. 17, 1904.
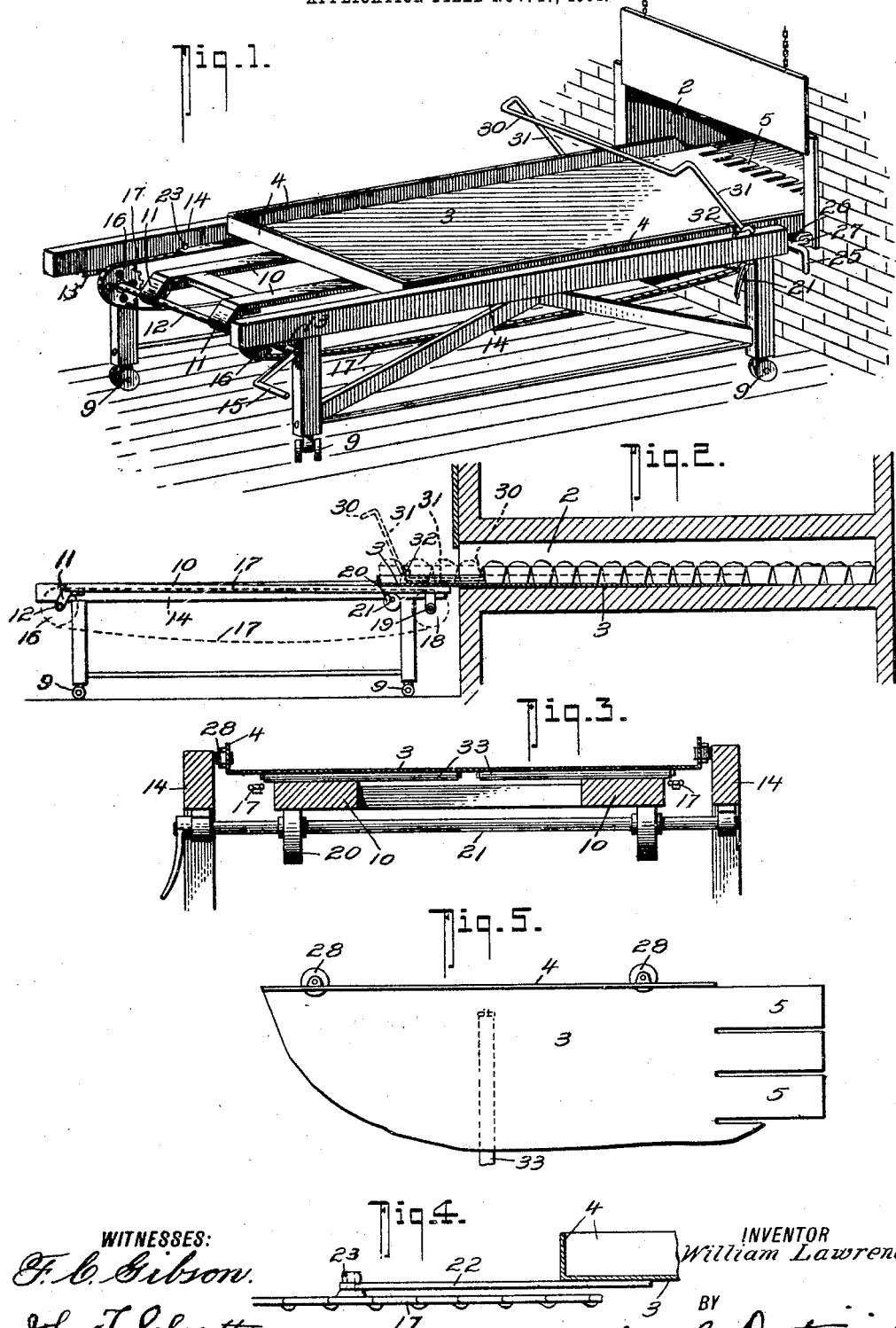
WITNESSES:
F. C. Gibson.
John T. Schrott.
INVENTOR
William Lawrence.
BY
Fred G. Dieterich
ATTORNEY No. 795,141.

Patented July 18, 1905.

UNITED STATES PATENT OFFICE.

WILLIAM LAWRENCE, OF VANCOUVER, CANADA.

MEANS FOR CHARGING BREAD INTO AND WITHDRAWING IT FROM BAKERS' OVENS.

SPECIFICATION forming part of Letters Patent No. 795,141, dated July 18, 1905.

Application filed November 17, 1904. Serial No. 233,154.

*To all whom it may concern:*

Be it known that I, WILLIAM LAWRENCE, a citizen of the Dominion of Canada, residing at the city of Vancouver, in the Province of British Columbia, Canada, have invented a new and useful Improvement in Means for Charging Bread into and Withdrawing it from Bakers' Ovens, of which the following is a specification.

My invention relates to an improved means for delivering bread within a baker's oven and for removing it therefrom, and is designed to embody the advantages of an oven draw-plate; but instead of leaving a draw-plate with its charge of bread within the oven during baking my device transfers the whole charge to within the oven from a tray forming a slidable attachment to an external table, which may be moved to in front of the oven-door, and when the bread is baked the same tray is passed under the tins of loaves and the charge is withdrawn from the oven.

The device is designed so as to be applicable to any baker's oven without material change of the oven-chamber or mountings if the heating of the oven is sufficiently uniform to enable an entire batch of bread to be done within one time limit.

The particular construction of my device and the manner of its operation is fully described in the following specification, reference being made to the drawings which accompany it.

Figure 1 is a perspective view showing the transfer-tray as partially entered into the oven-chamber. Fig. 2 is a vertical longitudinal section, to a small scale, showing in the full lines the operation of depositing bread within the oven and by the dotted lines of loaves and transfer-bar the operation of the removal of bread therefrom. Fig. 3 is a cross-section through the transfer-tray, showing the means for elevating and depressing the free end of the frame on which such tray is slidable. Fig. 4 is an enlarged detail showing the means for removably attaching the transfer-tray to the chains by which it is operated. Fig. 5 is a part plan of the tray, showing the bottom and side rollers.

Throughout the drawings the baking-chamber of an oven is represented by 2. Supported on a framework 14 at a height from the floor slightly above the height of the bottom of the oven-chamber is a transfer-tray 3, having upwardly-projecting edges 4 at the sides and back and provided across the front edge with denticulations 5 to permit of greater flexibility of that edge in adapting itself to inequalities in the bottom of the oven-chamber upon which the front edge of the tray is designed to bear. This transfer-tray 3 is directly supported on the longitudinal members of a frame 10, pivotally mounted at one end by bearings 11 on a shaft 12, which shaft is rotatable in bearings 13, secured to the frame 14. The shaft 12 is rotatable in its bearings 13 by a crank-handle 15 and has secured on it within the width of the tray sprockets 16, around which endless chains 17 pass and extend to the other end of the frame 14 and pass round sprockets 18, secured on a shaft 19 on the free end of the frame 10, which at this end is supported on eccentrics 20 on a shaft 21, by which means the free end of the pivotally-mounted frame 10 may be raised or lowered to adapt it to the requirements of the height of the bottom of the oven-chamber from the floor.

The transfer-tray 3 is slidable on the longitudinal members of the pivotally-mounted frame 10 and is connected to the chains 17 by extension-bars 22, secured to the tray and projecting backward from it. These extension-bars 22 (see Fig. 4) are removably secured to the chains 17 by means of studs 23 upwardly projecting from a special link of the chain. This manner of attachment enables the entire length of tray 3 to be projected by the chains 17 beyond the length of the frame on which they are supported and to within the mouth of the oven.

The supporting-frame 14 is mounted on universal casters 9 to facilitate its movement about the floor of the bakery, and across the front end of the frame 14 is a slidable bar 25, operable by a handle from either side and having secured to it parallel bolts 26, which when the frame is pushed up against the oven-front will slidably enter corresponding holes in outwardly-projecting lugs 27 on the front plate of the oven and secure it thereto. Pivotally mounted on the upper side of the side members of the frame 14 toward the forward end is a transfer-bar 30, the side members 31 of which are downwardly and backwardly bent in such a manner that when the side members are lying on the upper side of the frame the crossbar itself will project beyond the length of the frame and be clear of the tray. The ends of the side members 31 are bent outwardly at right angles to form bearing portions and then bent again at right angles to said bearing portions to provide a heel 32, on which the frame will rest when thrown into the upward position, as clearly shown in Fig. 1 and as shown in dotted lines in Fig. 2.

In the operation of the device to transfer a batch of bread to within the oven-chamber the tray 3 is run backward over the support-frame 14 and is loaded with bread in tins. The support-frame 14 is then pushed up to the mouth of the oven and secured in position by the slidable bolts 26. The forward or free end of the frame 10, on which the bread-tray slides, being adjusted to the level of the bottom of the oven-chamber, the tray 3, with its charge of bread, is run within the chamber by means of the chains 17, operated by the crank-handle 15. The pivotally-mounted transfer-bar 30 is then thrown forward to the position shown in full lines in Fig. 2, in which position its cross-bar will engage the tins of bread on the tray 3 and the tray being run back the whole charge is forced off the tray by the cross-bar 30 and left within the oven-chamber. (See full lines in Fig. 2.) The device may then be disconnected from the oven-front to receive another charge of bread to deposit within another oven. To remove the bread from the oven, the device is wheeled up to and secured as before to the mouth of the oven, with the transfer-bar 30 turned into the backward position, as shown in Fig. 1 and by dotted lines in Fig. 2, when the tray being run in its front edge will pass beneath the tins of bread, and the whole charge is received upon the tray, which may then be withdrawn over the support-frame and wheeled away to be deposited upon the storage-shelves by a similar operation to what was before described for charging the oven.

Rollers 33 may be provided on the under side of the tray to facilitate its movement when a load of bread is upon it, and rollers 28 are inserted in the sides of the tray to prevent undue friction against the sides of the oven-chamber. When bottom rollers are provided, the denticulations 5 will require to be downwardly bent slightly, and the back of the supporting-frame may be mounted at a higher level than the front to insure that the front edge of the tray is in contact with the bottom of the oven-chamber.

The advantages of this device are that it is applicable to any oven-chamber without the necessity of any considerable change in the mountings, &c., as the entire apparatus is associated with the external support and operating mechanism of the tray. There is also the advantage that the tray itself is not left in the oven with the charge, so that it is not exposed to the heat of the oven, as in devices of the draw-plate class, but is merely used as a means for transferring the bread to within the oven and removing it therefrom after baking.

In not being exposed for any considerable length of time to the heat of the oven the material of the tray is not liable to be warped by the action of the heat and may be made very light, in which case it will be readily adaptable to inequalities of the oven-bottom, which pliability is increased at the front edge by its denticulation, as described.

Having now particularly described my invention and the manner of its operation, I hereby declare that what I claim as new, and desire to be protected in by Letters Patent, is—

1. In a means for charging bread into and withdrawing it from an oven, the combination of a frame arranged exterior to the oven, a tray supported by and endwise slidable on said frame and means supported by said frame and attached to said tray for sliding the tray into and withdrawing it from the oven.

2. In a means for charging bread into and withdrawing it from an oven, the combination of a frame arranged exterior to the oven, a tray supported by and endwise slidable on said frame and means supported by said frame and attached to said tray for sliding the tray into and withdrawing it from the oven, and means free of the tray for engaging the bread-tins or loaves upon the tray behind such loaves while the tray is within the oven substantially as shown and described.

3. In a means for charging bread into and withdrawing it from an oven, the combination of a frame arranged exterior to the oven, a bread-carrying tray endwise slidable on and connected to said frame, means for moving said tray endwise on the frame and for projecting it entirely within the oven, such last-named means comprising a plurality of wheels arranged toward the ends of the frame, an endless chain passing around said wheels, means for operating said endless chain, bars secured to the tray and projecting rearwardly from the back of the tray, and means for removably securing said bars to the chains, substantially as shown and described.

4. In a device of the character stated, a frame arranged exterior to an oven, a tray connected to and endwise movable on said exterior frame, means for moving said tray endwise into and out of the oven, means for raising and lowering the front end of the frame, and means for engaging the bread-tins upon the tray, as the tray is being withdrawn from the oven to hold the said bread-tins within the oven, as the tray is being withdrawn substantially as shown and described.

5. In a means for charging bread into and withdrawing it from an oven, a movable supporting-frame, a shaft rotatable in bearings in the supporting-frame, a slide-frame pivotally mounted at one end on said shaft, means for raising and lowering the front end of said slide-frame substantially as shown and described.

6. In a means for charging bread into and withdrawing it from an oven, a movable supporting-frame, a shaft rotatable in bearings in the supporting-frame, a slide-frame pivotally mounted at one end on said shaft, means for raising and lowering the free end of said slide-frame, said last-named means comprising a shaft rotatable in bearings toward the other end of the supporting-frame, eccentrics mounted on said shaft upon which the free end of the slide-frame rests, substantially as shown and described.

7. In a means for charging bread into and withdrawing it from an oven, the combination of a frame arranged exterior to the oven, a tray endwise movable on said frame, means for securing said frame to the front plate of the oven, means secured to the frame for moving the tray endwise and projecting it entirely within the oven, a cross-bar pivotally mounted on the frame and susceptible of being projected into the oven clear of the edges of the tray and corresponding with the back edge of said tray while the tray is within the oven substantially as shown and described.

8. In a means for charging bread into and withdrawing it from an oven, the combination of a frame arranged exterior to the oven, a tray connected to and endwise movable on said frame, shafts mounted toward the ends of the frame, sprocket-wheels secured to said shafts, endless chains passing over such sprocket-wheels, means for operating said chains, means for removably securing the tray to the chains, friction wheels or rollers mounted on the bottom and sides of said tray and means for securing the frame to the front of the oven, substantially as shown and described.

9. In a means for charging bread into and withdrawing it from an oven, the combination of a table or frame arranged exterior to the oven, a bread-carrying tray endwise movable on said frame, means for securing said frame or table to the front plate of the oven, means for moving the tray, said means comprising shafts rotatably mounted on the table or frame, sprocket-wheels on said shafts, endless chains passing over said sprocket-wheels, means for rotating one of said shafts to impart motion to said sprocket-chains, and means for removably securing the tray to the chains, said last-named means comprising bars secured to the tray and projecting backward from the rear end thereof a sufficient distance to project the tray within the oven substantially as shown and described.

10. In an apparatus of the class described, a supporting-frame arranged exterior to the oven, a bread-carrying tray secured to and endwise movable on said frame, means for moving said tray endwise on said frame, said tray having denticulations across its front edge substantially as shown and described.

11. In a means for charging bread into and withdrawing it from an oven, the combination of a frame arranged exterior to the oven, a tray endwise slidable on said frame, means supported by the frame and attached to the tray for sliding the tray into and withdrawing it from the oven, said tray having denticulations across its front edge substantially as shown and described.

12. In a means for charging bread into and withdrawing it from an oven, the combination of a movable frame arranged exterior to the oven, casters secured to the said frame, a shaft rotatably mounted across the back end of said supporting-frame, a supplemental frame pivotally mounted within the supporting-frame upon said shaft, a vertically-adjustable support mounted at the other end of said supporting-frame to receive the free end of the supplemental frame, sprocket-wheels mounted on the first-mentioned rotatable shaft, corresponding sprocket-wheels arranged toward the free end of the pivotally-mounted frame, endless chains passing around said sprocket-wheels, and a tray endwise movable on the pivotally-mounted frame, and removably connected to said chains, substantially as shown and described.

13. In a means for charging bread into and withdrawing it from an oven, the combination of a movable frame arranged exterior to the oven, casters secured to said frame, a shaft rotatably mounted across the back end of said supporting-frame, a supplemental frame pivotally mounted within the supporting-frame upon said shaft, a vertically-adjustable support mounted at the other end of said support-frame to receive the free end of the supplemental frame, sprocket-wheels mounted on the first-mentioned rotatable shaft, corresponding sprocket-wheels arranged toward the free end of the pivotally-mounted frame, endless chains passing round said sprocket-wheels, and a tray endwise movable on the pivotally-mounted frame, bars backwardly projecting from the back edge of the tray and removably connected to said endless chains, said tray having upwardly-turned edges on the sides and back and denticulations along its front edge, a transverse bar arranged across the path of the tray and pivotally mounted toward the front of the supporting-frame, said transverse bar having rectangularly-bent sides toward its pivot so as to be susceptible of being projected upwardly clear of the supporting-frame and of the edges of the tray and having a check against which it will rest when turned upwardly, and means for connecting the supporting-frame to the front face of an oven.

In testimony whereof I have signed my name to this specification in the presence of two subscribing witnesses.

WILLIAM LAWRENCE.

Witnesses:
ROWLAND BRITTAIN,
BENJAMIN TOURGIS.